March 3, 1970

C. W. HURST 3,499,071

APPARATUS FOR IN-MOLD REMOVAL OF FLASH

Filed June 19, 1967

INVENTOR.
Charles W. Hurst

BY

ATTORNEY

March 3, 1970  C. W. HURST  3,499,071
APPARATUS FOR IN-MOLD REMOVAL OF FLASH
Filed June 19, 1967  3 Sheets-Sheet 2
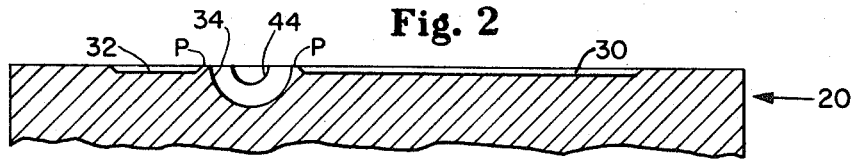
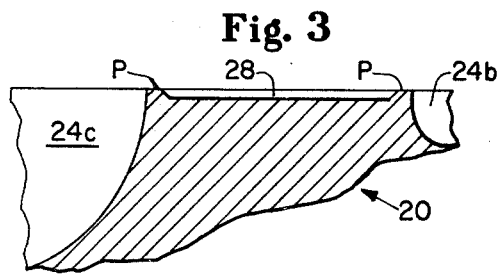
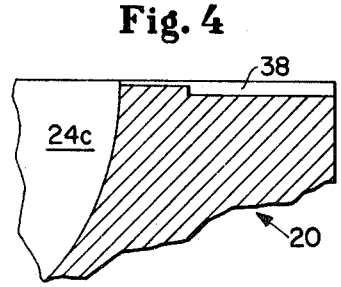
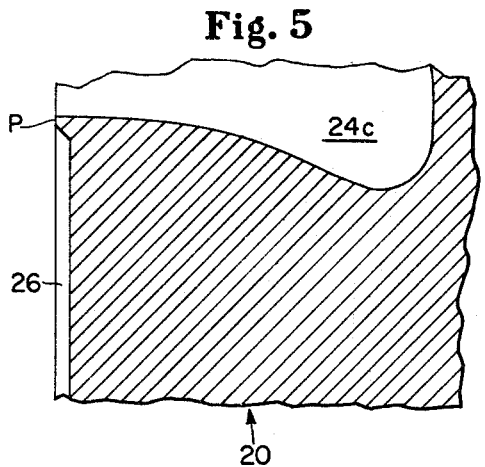
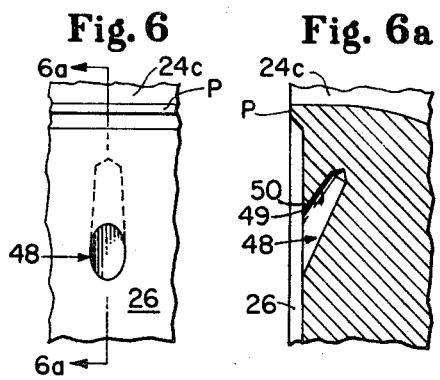
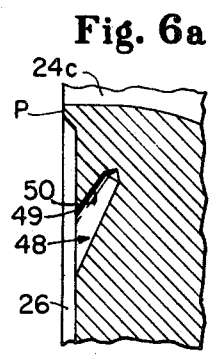
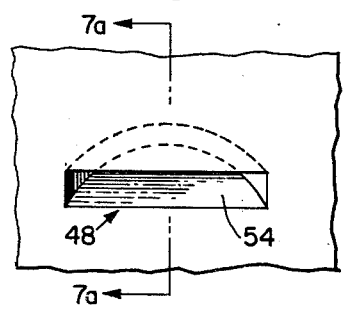
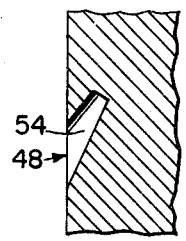
INVENTOR.
Charles W. Hurst
BY
ATTORNEY March 3, 1970  C. W. HURST  3,499,071
APPARATUS FOR IN-MOLD REMOVAL OF FLASH
Filed June 19, 1967  3 Sheets-Sheet 3
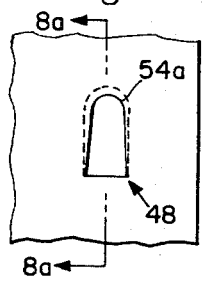
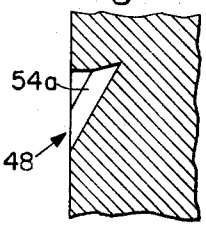
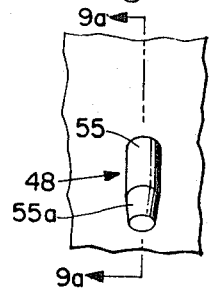
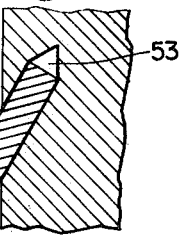
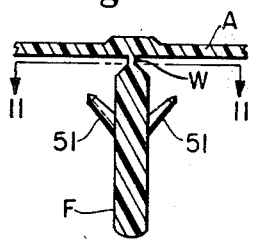
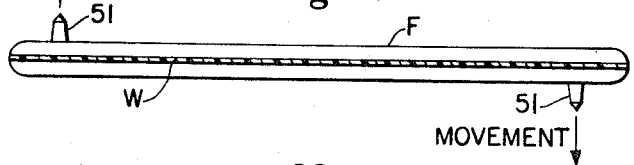
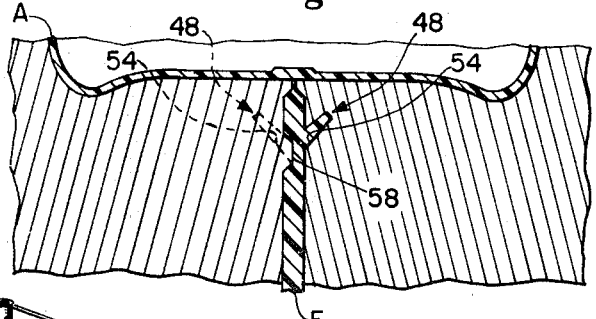
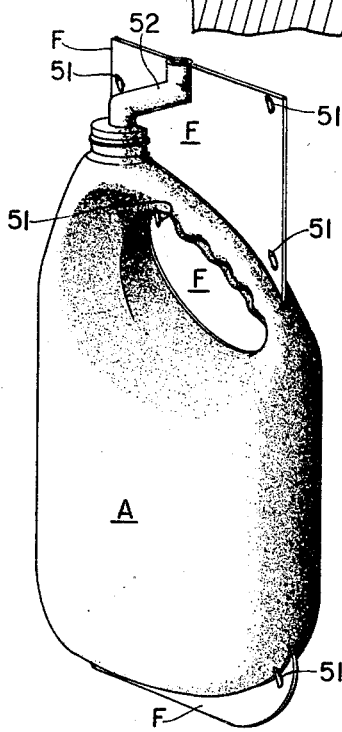
INVENTOR.
Charles W. Hurst
BY
ATTORNEY United States Patent Office 3,499,071
Patented Mar. 3, 1970

3,499,071
APPARATUS FOR IN-MOLD REMOVAL OF FLASH
Charles W. Hurst, Cincinnati, Ohio, assignor to The Procter & Gamble Company, Cincinnati, Ohio, a corporation of Ohio
Filed June 19, 1967, Ser. No. 646,900
Int. Cl. B29c 17/07, 17/12
U.S. Cl. 264—94                                    21 Claims

ABSTRACT OF THE DISCLOSURE

In a partible mold for producing an article from a plastic substance and with which excess material is formed as flash attached to the article along a frangible connecting web, the provision of flash interlocking means associated with the mold members and adapted to act on oppositely disposed, spaced portions of the flash to twist the same relative to the article during the commencement of mold separation, thereby severing the flash from the article.

---

This invention relates to means adapted to remove flash which is attached to an article following its formation by molding and, more particularly, to means associated with partible mold members and adapted to sever such flash from the article prior to its removal from the mold.

In the molding of articles from plastics, problems have been experienced in connection with the removal of flash subsequent to the molding operation. Flash is a term in the molding art which denotes excess molding materials used in the process of forming an article and which are not incorporated in the article itself but, rather, become waste or scrap material which is either discarded or preferably reprocessed. As used herein, however, the term "flash" will denote only such excess material which is attached to the article or its appurtenances along a thin, frangible connecting web and any balance of the excess material which does not fit this description will be referred to as "scrap" of one form or another. For example, during the blow molding of a handle-equipped bottle having a small eccentric spout from an extruded parison and using equipment in which the air emanates from a port in the mandrel of the extrusion die and the mold is upright, i.e., the spout portion is adjacent the die, air passageway "scrap" (connected to the article by portions of the excess material approximately as thick as the adjacent article walls) is formed intermediate the spout and the port in the mandrel, but the excess material at the lower end of the parison is formed into "flash" (commonly termed "tail" in the industry) and flash is also formed adjacent the spout and air passageway scrap and intermediate the inside surface of the handle and the body of the article. Following separation of the molds after the blowing operation the bottle with the flash and scrap still attached is typically fed through further equipment which is adapted to mechanically remove such excess. Alternatively, the flash can be removed by hand utilizing a knife or razor for a tool, in accordance with present commercial practice.

Hand trimming is fairly expensive and frequently results in articles which are not of good quality. In this connection, the containers being trimmed of flash by hand are occasionally slit or weakened to an extent whereby subsequent failure occurs. In addition there can be quite a variation in the amount of fin, i.e., the unremoved portion of the flash, with a consequent effect on the appearance of the article.

On the other hand, where the flash is trimmed mechanically it is necessary to design special machines to accomplish this function. Equipment design and construction is expensive and the maintenance, operation and adjustment thereof is additionally financially burdensome. Furthermore, in connection with the use of such machines for the removal of inside flash, i.e., flash which is surrounded by portions of the article formed, special problems are experienced in properly designing the die configuration and size due to the fact that the article is dimensionally unstable (shrinks) subsequent to the forming operation. This problem is compounded when such flash trimming equipment is adapted to trim the flash from articles produced by a plurality of molds and/or machines. It may therefore be readily seen that fluctuations in orientation, size and, possibly, configuration require the trimming die to be adapted for handling maximum variations in the article. Consequently, some of the flash will be left attached to the articles in the form of a fin, a condition which is not only unattractive but may prove a detriment to use of the article by the prospective consumer. Where outside flash is involved, automatic trimming machines can be employed more successfully but still require capital investment, attention and maintenance, expenses which do not directly contribute to an improvement in the article itself.

It is an object of the present invention to obviate the above problems.

It is a further object of the present invention to provide an apparatus adapted to sever flash from an article, immediately following the molding thereof, by the operation of the molds themselves.

Another object of the present invention is to provide apparatus to sever flash from a molded article without necessarily resorting to moving parts not otherwise associated with the molding operation, whereby the article is trimmed of flash prior to its removal from the mold.

It is a still further object of the present invention to provide apparatus adapted to deflash molded articles immediately subsequent to the formation theerof, which apparatus does not require moving parts additional to those commonly employed in connection with the molding operation and which are so configured and arranged with respect to one another to permit relatively easy subsequent release of the separated flash.

Briefly stated, in accordance with one aspect of the present invention there is provided in a partible mold, interlock means associated with each mold member in the flash-receiving areas theerof. The interlock means are adapted to engage at least a pair of spaced portions of the flash, one such portion being on each side of and integral with the flash, and are adapted to apply substantially oppositely directed pulling forces to the spaced portions, whereby to impart a twisting movement relative to the article as the mold members commence movement to a separating position to thereby fracture the web connecting the flash to the article.

While the specification concludes with claims particularly pointing out and distinctly claiming the subject matter which is regarded as forming the present invention, it is belived that the invention will be better understood from the following description taken in connection with the accompanying drawings, in which:

FIGURES 2 through 5 are enlarged fragmentary sectional views taken along correspondingly numbered lines of the left mold member of FIGURE 1;

FIGURE 6 is an enlarged fragmentary elevational view illustrating the reentrant type interlock means illustrated at the lower end of the left mold member of FIGURE 1;

FIGURE 6a is a fragmentary sectional view taken along the lines 6a—6a of FIGURE 6;

FIGURE 7 is an elevational view of another embodiment of reentrant configuration;

FIGURE 7a is a fragmentary sectional view taken along the lines 7a—7a of FIGURE 7;

FIGURE 8 is an elevational view of a further embodiment of reentrant mold configuration;

FIGURE 8a is a fragmentary sectional view taken the lines 8a—8a of FIGURE 8;

FIGURE 9 is a fragmentary elevational view illustrating an embodiment in which the interlock means comprises a protuberance;

FIGURE 9a is a fragmentary sectional view taken along the lines 9a—9a of FIGURE 9;

FIGURE 10 is a fragmentary cross-sectional view taken through one end of a piece of flash attached to a wall of a blow molded article and showing the formation of the flash resulting from the use of the reentrant configurations illustrated in FIGURES 1, 6 and 6a;

FIGURE 11 is a sectional view taken along the lines 11—11 of FIGURE 10, with arrows illustrating the direction of movement of each side of the flash during mold separation;

FIGURE 12 is an enlarged fragmentary vertical sectional view of the mold members of FIGURE 1 employing reentrant configurations of FIGURES 7 and 7a along with cooperating protuberances to assure complete interlock; and FIGURE 13 illustrates the result of blow molding a parison in the mold of FIGURE 1, including flash and scrap, at the end of article formation but before mold separation commences.

Figure 1:
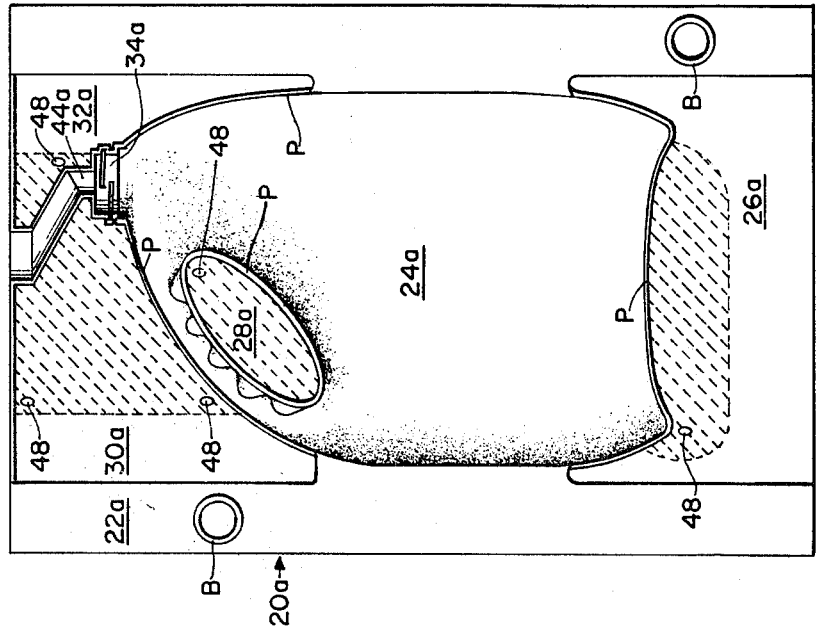
FIGURE 1 is an elevational view of a two-piece partable mold with the mold members separated and one rotated 180° from its operational position for clarity.
Figure 1:
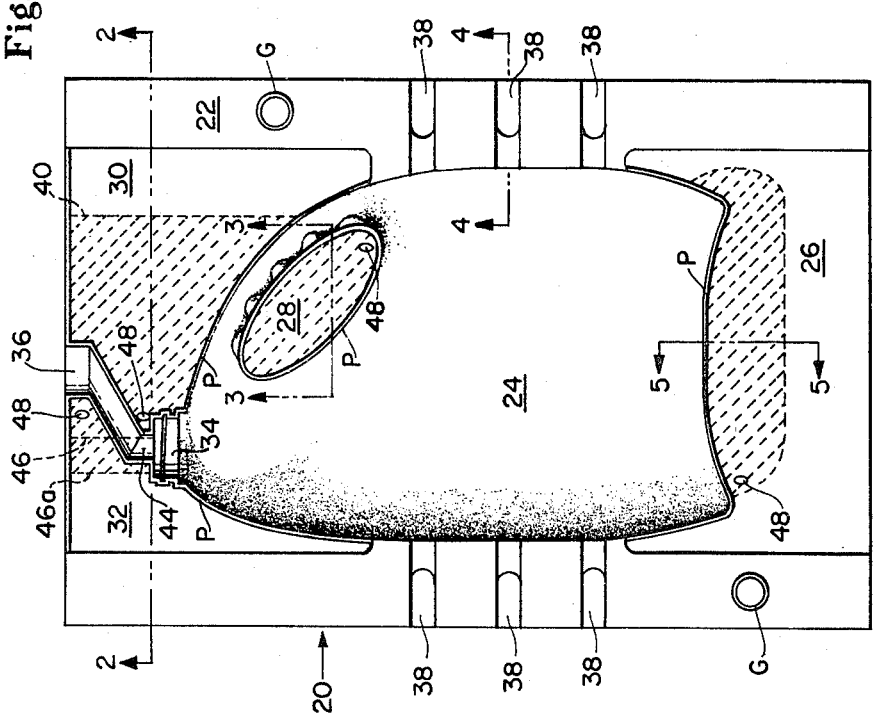

Referring to FIGURE 1 there is illustrated a pair of mold members 20, 20a which comprise a partable mold for forming an article from a plastic substance by blow molding techniques and which have cooperating faces 22, 22a adapted to be contiguous to one another in the article forming position and separated in an article removing position. The faces 22 and 22a are provided with cavities 24, 24a, each of which is adapted to define a specific portion of the exterior surface of the article, which in this case happens to be a large bottle or jug such as is commonly used in the packaging of liquid products. As will be noted, the bottle is equipped with an integral handle and an offset pouring spout.

The faces 22, 22a of the mold members 20, 20a are further provided with relieved areas adapted to receive flash during article forming, such relieved areas being identified by reference numerals 26, 26a, 28, 28a, 30, 30a, 32, 32a in the drawing. Each of these flash-receiving relieved areas are separated from the associated cavities 24, 24a by means of a narrow pinch-off land identified generally as P.

Pinch-off lands normally employed in mold members for blow molding have a width ranging from .010" to about 0.120". These are the portions of a mold which form weld lines between parts of the material being formed which were previously not joined. Generally speaking, it is desirable to use as small land as possible in blow molding, consistent with obtaining a good weld line. If too narrow a land is used, the weld line tends to be weak; on the other hand, if the land is too wide poor separation occurs and ragged flash results therefrom. For the purpose of this development it is preferred that lands P in the range of .010" to about .040" be employed, preferably between about .010" to about .025".

The pinch-off lands P are illustrated in somewhat more detail in FIGURES 2, 3 and 5. FIGURE 2 shows reliefs 30 and 32 adjacent the spout area 34 of cavity 24 and a pinch-off land P on each side of the spout area 34. Air passageway 44 interconnects the spout area 34 with an opening 36 (see FIGURE 1) adapted to communicate with a port (not shown) in the mandrel of an extrusion die and through which the blowing air passes. Thus, the air passes through the port in the mandrel, into the opening 36, through air passageway 44 and spout area 34 to the cavity 24. During the blowing operation, of course, the air proceeds through portions of the parison lying within these mold portions.

It should be noted that each of the pinch-off lands P is joined to the relieved areas by a tapered side as an aid in developing a good welding line, i.e., one which is smooth on the outside and preferably forms an elevated band or bead on the inside as shown in FIGURES 10 and 12. The depth of the relieved areas 30 and 32 should be slightly less than the parison wall thickness so that each of the faces of the excess material trapped between relieved areas 30 and 30a and between relieved areas 32 and 32a intimately contacts mold material whereby to facilitate cooling. It will be understood that although the described embodiment has cooperating relieved areas in the face of each mold member, it would be feasible to have a flash-receiving relieved area only on one mold member; for example, by making the relieved area twice as deep as when cooperating relieved areas are employed. In this case, the area of the face of the other mold member corresponding with the relieved areas would contact the flash and therefore be the part of the other mold member with which this invention is concerned, as will be more fully understood from subsequent description. Also, the part of the face of the other mold member which opposes the pinch-off land P of the one mold member would, in effect, constitute a pinch-off land.

In FIGURE 3, the relieved area 28, surrounded by a continuous pinch-off land P, is located intermediate the handle forming portion 24b of the cavity 24 and the main body portion 24c thereof. This is the means by which a handhole is formed in the article.

FIGURE 5 shows the tail-forming relieved area 26 of the mold member 20 and the pinch-off land P associated with it. Here, as in connection with FIGURE 3, the comments above regarding the depth of the relieved area and the pinch-off land P construction are equally applicable. In one successfully operated blow mold such lands measured approximately .015" and the angle at which the relief was made alongside the pinch-off lands measured approximately 45°, the total relief depth being approximately .080" for parisons having a wall thickness of about .100". Details of the design of the relieved areas adjacent the pinch-off lands in blow molding molds are well known to those of ordinary skill in the art and are therefore not explained in further detail herein.

A pair of guide pins G are provided, one on each side of cavity 24 of the mold member 20 and projecting outwardly of face 22, and correspondingly located bushings B are recessed in the face 22a of mold member 20a. The interior dimension of bushings B are slightly greater than the outside diameter of the guide pins G and are thereby adapted to receive the guide pins G in telescoping relation. The guide pins G and bushings B are employed to maintain the alignment of the mold members 20, 20a as they are brought together preparatory to the article forming operation. By such means the cavities 24, 24a and the various pinch-off lands P of the mold members are placed in positions directly opposed, in perfect alignment with one another.

Air vents 38 are provided on each side of the mold member 20, extending from the outer edge thereof to the side periphery of main body portion 24c of cavity 24. Referring to FIGURE 4 it will be seen that the air vents 38 can merely comprise end-milled slots which permit the escape of air during the molding process. The size of the slots and the number thereof are not critical; however, it has been found satisfactory to use six ½" slots which present the stepped appearance of FIGURE 4. The deeper portion of the slot can measure .010" and the shallower portion, that adjacent the cavity 24, can measure .001" whereby to prevent obvious marking and the escape of the material being formed while deriving the benefit of the provision of the air vent. If desired, the cavities 24, 24a can be sand-blasted to facilitate air escape around the periphery of the article.

The mold members can be constructed of any of the known mold materals such as beryllium copper, cast aluminum alloys, zinc alloys, bronze or steel. The pinch-off sections of nonferrous molds, however, are generally hard, tough, steel inserts. In addition, the mold members can be made in sections and assembled, but the illustrated embodiment comprises one piece. Although not shown in the drawings, the mold members used in connection with blow molding operations are usually liquid-cooled so as to promote the rapid setting of the material in its blown condition. These aspects of mold construction are well known and therefore do not require further discussion.

The blow molding (i.e., article forming) operation generally consists of three stages; first, melting or plasticizing the resin; second, forming the parison or preform; and third, inflating the parison in a blowing mold to produce the desired article. In the most commonly employed process, the parison is extruded as a tube between a pair of separated mold members, following which the mold halves are brought together and air pressure is applied to the interior of the tube in order to make the plastic material conform to the mold cavity. This is the type of molding process which will be discused, although those skilled in the molding art will appreciate that the subject invention can readily apply to the equipment employed in using other molding techniques.

The tube extrusion, the parison, is of greater length than the cavities 24, 24a of the mold members 20, 20a, and, consequently, a portion of the parison below that which is formed into the article shape is squeezed between contiguous surfaces of the mold members 20, 20a (the flash-contacting, relieved areas 26, 26a described above) as they close. The mold members 20, 20a are pressed together by a force of considerable magnitude, e.g., 15 tons, and held in the closed position for a brief period of time while blowing and cooling. The clamping time can vary as required for the article being formed and generally is in the range of from about 3 to about 30 seconds. The excess length of material at the bottom is generally in the form of a depending boat-shaped tail (flash) attached to the article along a thin, frangible connecting web formed between cooperating pinch-off lands P of the respective mold members adjacent the areas 26, 26a. Although the thickness of the connecting web will vary in accordance with the width of pinch-off land P, the rapidity of closure, the clamping pressure, the temperature of the material comprising the parison and like parameters, it is generally in the range of from about .003" to about .020".

When an article having an integral handle is to be formed by blow molding, the lateral dimensions of the parison must be sufficiently large to cause at least its side margins on the handle side of the parison to extend into the handle-forming portion 24b of the cavity 24 so as to permit the action of the pressurizing air to fill out the material along the full length of that portion. In this connection, for a mold such as that illustrated in FIGURE 1 and referring specifically to mold member 20, the extremity of the parison on the handle side of the bottle can be located at least about even with the dotted line 40 or outwardly therefrom to permit adequate fill out.

As further shown in FIGURE 1 the spout area 34, 34a of the article to be formed by the mold members 20, 20a is offcenter with respect to the cavities 24, 24a and, consequently, there are provided the previously mentioned air passageway 44 in mold member 20, and a corresponding air passageway 44a in mold member 20a, by means of which air is conducted from the port in the central portion of the mandrel of the extrusion die to the interior of the cavities 24, 24a. Pinch-off lands P also intervene the passageways 44, 44a and the adjacent relieved areas 30, 32 and 30a and 32a, respectively.

It will be understood that different mold constructions can utilize varying techniques in delivering the blowing air or gas to the parison interior, e.g., a blowing pin in the mold bottom, injecting the air through a blowing mandrel extending through the table on which the mold is mounted, and the like. Such differing constructions will cause flash distribution or appearance to change from that described herein; however, the application of the present invention to the separation of the flash in such varied constructions will readily be apparent to those of ordinary skill in the molding art in view of the present disclosure and therefore the discussion herein will be restricted to the illustrated embodiment.

With the described mold apparatus, to assure a complete passageway during the article-forming operation it is also necessary for the extruded parison to have an outer limit on the finish side of the mold members 20, 20a which falls within the limits of air passageways 44, 44a at their junctions with spout areas 34, 34a (for example, along dotted line 46) or outwardly therefrom, as along dotted lines 46a, the outer limit used in the drawings. Thus, following the extrusion of the parison, the bringing together of the mold members 20, 20a and the completion of the blowing operation, an article A is formed to which flash F is attached as illustrated in FIGURE 13. The extent of flash formation is illustrated by the shaded areas on mold members 20, 20a of FIGURE 1 for convenience of subsequent description.

The flash-contacting (shaded) regions of each of the mold members 20, 20a are provided with interlock means 48 adapted to engage a pair of spaced portions of each piece of flash, one such portion being on each side of and integral with such piece of flash F (see FIGURES 10–13), and to apply substantially oppositely directed pulling forces to the spaced portions so as to impart a twisting movement to the piece of flash F relative to the article A as the mold members commence movement to their separated, article-removing position. This twisting movement, a couple effect, fractures the thin, frangible connecting web W which secures the piece of flash F to the formed article A and thereby dissociates the same.

Each of the shaded portions of each mold member 20. 20a of FIGURE 1 has at least one such interlock means 48 associated therewith. The interlock means 48 of each of the mold members 20, 20a must be spaced, i.e. offset, from one another along the plane of the relieved areas when the mold is in the closed, article-forming position, such spacing preferably being as great as possible. In this connection, the interlock means 48 of corresponding flash-contacting regions of the mold members 20, 20a preferably lie adjacent opposite ends of the pinch-off lands defining such regions, i.e., one of the interlock means 48 is located at one end of the flash-contacting region of mold member 20 and another interlock means 48 is located at the oppositely disposed end of the flash-contacting region of mold member 20a. In order to assure good operation consistently, the location of the interlock means 48 must be within the confines of the flattened parison limits and desirably is located adjacent the pinch-off land of each mold member.

As shown in FIGURES 1, 6 and 6a each interlock means 48 can comprise a reentrant configuration such as an outwardly tapered hole (i.e., a hole in which the dimensions at the surface are greater than that at the inner end) which can be drilled upwardly from the bottom of the mold at an angle of approximately 30° or less with the faces 22, 22a of the mold members 20, 20a. The diameter of the tapered hole is not of specific importance so long as it is sufficiently large to assure that the nib of plastic which will be forced upwardly therein during the molding operation is strong enough to withstand pulling stresses experienced during the commencement of the mold opening operation. In this connection, holes having each side tapered at about 2° with the axis thereof and a diameter of about 1/8" through point 49 of FIGURE 6a, drilled at an angle of about 20° to the face of the mold member to an inclined depth of about 1/8" from point 49 have been found satisfactory when used in association with a mold for blowing polyethylene bottles from a parison having a wall thickness of approximately .100″ and in which the connecting web W between the flash F and the article A is approximately .010″ thick. It will be understood that such parameters can be varied in accordance with the requirements for a particular application and are not critical except insofar the above-described nib strength requirement is concerned.

In operation, as the mold members 20, 20a approximate the various pieces of flash F are squeezed between corresponding portions of the flash-contacting regions of the mold members and some of the excess material is displaced upwardly into the tapered holes comprising the interlock means 48, thereby forming the integral spaced portions previously mentioned. During the cooling cycle the bottle, the main body of the flash F and the integral spaced portions, i.e., nibs 51 (see FIGURES 10 and 11), of displaced plastic within the internal volume of the reentrant mold configuration of interlock means 48 are solidified. Then as mold separation commences the interfering surface 50 (FIGURE 6a) of the interlock means 48 (i.e., the surface interposed between part of the internal volume of the reentrant configuration and a flash-contacting region of the mold member aligned with the path of travel of the part in mold separation) moves at an angle with the adjacent surface of the nib 51. Since nib 51 is an integral part of the flash F, which in turn is attached to the article A, and since the article A supported vertically by the deeper portions of the cavity during commencement of opening and/or by the adherence of scrap to the extrusion die or to the material remaining therein, the nib 51 of plastic depressed within the interlock means 48 is not withdrawn when mold opening commences and, consequently, is pulled along with the mold member with which it is associated. In view of the fact that at least one interlock means 48 is used in each flash-contacting region of each mold member 20, 20a, as described above, the result is that one end of the flash F, is pulled in one direction by one mold member while the other end is pulled in the opposite direction by the other mold member, exerting a couple effect on the piece of flash F.

Since, as indicated above, the movement of the article A which has been formed is fairly restricted during the commencement of the opening operation and, furthermore, as a result of the connection which frequently exists between the article A and the parts of the blow molding apparatus or supplies (for example, between the material in, or parts of, the extrusion die and air passageway scrap generally referred to as 52 on FIGURE 13) the article A will also remain substantially rotationally stationary during this period of the operation. As a consequence, the flash F is twisted relative to the article A as mold opening movement commences and this causes the connecting web W intermediate the flash F and the article A to be fractured, severing the flash F completely from the balance of the mold structure.

Subsequent to the fracture of the connecting web W, further separating movement of the die members 20, 20a causes the nibs 51 within an interlock means 48 of one mold member to be pulled free. Because of the remaining effective interlock means 48 of the other mold member extends in a substantially downward direction, the remaining nib 51 will freely drop from its position within the interlock means 48 and thus be discarded by the action of gravity. It will be understood, of course, that it is not essential that the interlock means 48 open generally downwardly since orientation in other, even varying, directions is feasible and stripping of the severed flash F may be accomplished by means of one or more air jets, stripping fingers or the like. However, it is preferable to orient and shape the interlock means 48 to employ gravity as an aid in this stripping operation.

It is not essential that the reentrant interlock means 48 be tapered if upon cooling the shrinkage of the material comprising the nib 51 is sufficient to permit its eventual withdrawal without binding, or if a positive stripping means is employed. An outwardly tapering configuration, however, is preferred from the standpoint of ease of stripping and the consequent reduction or elimination of moving parts or aids in accomplishing the release of the severed flash.

In some cases it is desirable to utilize a plurality of interlock means 48 on a flash-contacting region of a mold member as, for example, is shown in the shaded region of relieved area 30a in FIGURE 1. In this event, it is preferred that each of the interlock means associated with the same flash-contacting region be oriented to permit simultaneous free release of the nibs 51 formed therein unless a positive stripping aid is provided.

With respect to the spacing of corresponding interlock means 48 as far as possible from one another, it should be observed that for a given piece of flash F if such spacing is reduced appreciably the tendency is to strip the nibs 51 from the interlock means 48 prior to the rupture of the web W. If the piece of flash F is rigid at the commencement of mold opening, the ends of the flash F will remain in contact with the mold members 20, 20a and nibs 51 which are located toward the center of the flash F will tend to be rapidly withdrawn or sheared from the interlock means 48. On the other hand, if the flash F is flexible in the case of reduced spacing, the ends of flash F outboard of and on the same side as the nibs 51 will continue to remain in contact with the respective mold members and only the flash between the nibs 51 will be twisted. Since the lever arm between the nibs 51 is reduced, because it will be necessary to commence rupture of the web W in a central portion (requiring greater energy) and in view of the fact that the nibs 51 will also be flexible, stripping of the nibs 51 from the interlock means 48 prior to rupture of web W also tends to occur in this case. The minimum spacing for any particular application of the present invention is dependent upon specific conditions involved and can easily be determined by experimentation.

In the embodiment of FIGURES 7 and 7a an alternative form of reentrant mold configuration of interlock means 48 is disclosed in which a semi-circular, outward tapered slot 54 is milled in the flash-contacting region of the mold members. Here, again, the slot 54 is desirably faced in a downwardly opening position at an angle of approximately 30° or less with the face of the associated mold member. The operation of mold members employing slot 54 is substantially the same as that described previously in connection with the interlock means in which a tapered hole is employed. The dimensions of the slot are not critical so long as the material displaced therein at the time of article formation will withstand the stresses applied during flash removal.

FIGURES 8 and 8a illustrate the use of a dovetailed type slot 54a also preferably opening generally downwardly at an angle of 30° or less with the face of the associated mold member. The interlocking and flash severing operation with this embodiment is also similar to that described above and, similarly, the dimensions of the reentrant configuration are not critical so long as the displaced flash is strong enough to withstand the scrap severing stresses.

A further embodiment of an interlock means 48 is shown in FIGURES 9 and 9a. Here, a hole is drilled upwardly at an angle with the face of a mold member and a pin 55 telescoped therein with its outer end exposed beyond the face of the flash-contacting region of the mold member to thereby form a protuberance. Preferably, the exposed end 55a of pin 55 is tapered to facilitate easy release of flash subsequent to the severing thereof. Although not critical, the principal diameter of the pin 55 can be approximately ⅛″ and the pin 55 can have an exposed length (from point 55b) of about ⅜″, a taper at its end over a length of ⅛″ to a diameter of ⁷⁄₆₄″ and be pressed within an appropriately sized hole set at an angle of about 30° or less with the flash-contacting face. When thus sized, the other mold member usually will be configured to accept the protuberance, as described below. Alternatively, the protuberance can be limited in projection to less than the total relief of the mating flash-contacting regions and, if desired, a reentrant groove or other form of undercut can be made on the protuberance whereby to permit the same to interlock with sufficient material so as to obviate premature stripping, i.e., before the web W is ruptured. Many changes in size, shape and other parameters of such a protuberance are, of course, feasible so long as the protuberance has an interfering surface which is adapted to engage a portion of the flash lying along the path of travel of the interfering surface in mold separation and intermediate the interfering surface and the mold member with which the protuberance is associated. In the illustrated embodiment described, such interfering surface is identified by reference numeral 56.

Occasionally, it may be desirable to have corresponding portions of the flash-contacting region of the opposite mold member configured to cooperate so as to assure the proper displacement or packing of material into or around the interlock means 48. For example, FIGURE 12 illustrates such cooperating means comprising a raised area 58 directly opposite an interlock means comprising a slot 54 such as described in connection with FIGURES 7 and 7a. The raised area 58 acts directly on the flash lying between it and the slot 54 so as to assure the displacement of a sufficient portion of the excess material into the slot 54 to enable the interlock means to function well in use. The same sort of cooperation is generally necessary in connection with protuberances such as illustrated in FIGURE 9. In this case the oppositely disposed surface of the other mold member can contain a depression (not shown) adapted to receive the protuberance so as to eliminate the problem of contact during the closing operation.

Many modifications of the above invention may be used and it is not intended to hereby limit it to the particular embodiments shown or described. The terms used in describing the invention are used in their descriptive sense and not as terms of limitation, it being intended that all equivalents thereof be included within the scope of the appended claims.

What is claimed is:

1. In a partable mold for forming an article from a plastic substance and in which excess material in the form of at least one piece of flash is attached to the article along a thin, frangible connecting web, said mold comprising a pair of mold members adapted to be moved relative to one another to a separated, article-removing position, each mold member having a face with a cavity therein defining a portion of the exterior surface of the said article, said faces being contiguous to one another in the article forming position with the cavities therein in alignment, the face of at least one mold member being provided with a flash-receiving relieved area separated from the article defining cavity therein by a narrow pinch-off land, the other mold member being provided with a pinch-off land adapted to cooperate with the pinch-off land of said one mold member to shape the said connecting web therebetween during article formation, the improvement which comprises: a first interlock means associated with said relieved area and a second interlock means offset from said first interlock means and associated with an area, said interlock means being adapted of the opposite mold member corresponding with said relieved area to engage a pair of spaced portions of said flash, one such portion being on each side of and integral with said flash, and to apply substantially oppositely directed pulling forces to said spaced portions whereby to impart a twisting movement to said flash relative to said article as said mold members commence movement to their separated position subsequent to article formation and thereby fracture said connecting web.

2. The mold of claim 1 in which at least one said interlock means comprises a reentrant mold configuration having an interfering surface interposed between a part of the internal volume of said configuration and a flash-contacting region of the associated mold member generally aligned with the path of travel of said part in mold separation, said reentrant mold configuration being located at a position in which flash is displaced into said part of the said internal volume during article formation.

3. The mold of claim 1 in which at least one said interlock means comprises a protuberance in the flash-contacting region of a mold member, said protuberance having an interfering surface which is adapted to engage a said portion of said flash lying along the path of travel of said interfering surface in mold separation and intermediate said interfering surface and the mold member with which said protuberance is associated.

4. The mold of claim 1 in which one of said interlock means is located adjacent the pinch-off land of each mold member.

5. The mold of claim 1 in which one of the said interlock means is located at one end of the flash-contacting region of said one mold member and another interlock means is located at the oppositely disposed end of the flash-contacting region of the other mold member.

6. The mold of claim 5 in which each of said interlock means is located adjacent the pinch-off land of its associated mold member.

7. The mold of claim 1 in which each interlock means has an interfering surface adapted to engage a said portion of said flash, said interfering surface being oblique with respect to the face of the associated mold member, and said interlock means are so-configured and oriented that following the rupture of said connecting web the release of said portions of the severed flash is permitted.

8. The mold of claim 7 in which the included angle between the axis of each interlock means and the face of the associated mold member is less than about 30°.

9. The mold of claim 7 in which each of said interfering surfaces extend generally downwardly to permit downward release of said flash.

10. The mold of claim 9 in which the included angle between the axis of each interlock means and the face of the associated mold member is less than about 30°.

11. The mold of claim 7 in which one of said interlock means is located adjacent the pinch-off land of each mold member.

12. The mold of claim 7 in which one of the interlock means is located at one end of the flash-contacting region of said one mold member and another interlock means is located at oppositely disposed ends of the flash-contacting region of the other mold member.

13. The mold of claim 12 in which each of the oppositely disposed said interlock means is located adjacent the pinch-off land of its associated mold member.

14. The mold of claim 7 in which at least one said interlock means comprises a reentrant mold configuration in which said interfering surface is interposed between a part of the internal volume of said configuration and a flash-contacting region of the associated mold member generally aligned with the path of travel of said part in mold separation, said reentrant mold configuration being located at a position in which flash is displaced into said part of the said internal volume during article formation.

15. The mold of claim 14 in which the interfering surface of said reentrant mold configuration extends generally downwardly and in which the included angle between the axis of said reentrant mold configuration and the face of the associated mold member is less than about 30°.

16. The mold of claim 15 in which one of said interlock means is located adjacent the pinch-off land of each mold member with one of the interlock means being located at one end of the flash-contacting region of said one mold member and another interlock means located at the oppositely disposed end of the flash-contacting region of the other mold member.

17. The mold of claim 14 in which the mold member opposite that having the said reentrant mold configuration is provided with a raised area adapted to pack said excess material into said reentrant mold configuration.

18. The mold of claim 7 in which at least one of said interlock means comprises a protuberance in the flash-contacting region of a mold member, the said portion of said flash engaged by the interfering surface lying along the path of travel of the interfering surface in mold separating and intermediate the interfering surface and the mold member with which the protuberance is associated.

19. The mold of claim 18 in which the interfering surface of said protuberance extends generally downwardly and in which the included angle between the axis of said protuberance and the face of the associated mold member is less than about 30°.

20. The mold of claim 19 in which one of said interlock means is located adjacent the pinch-off land of each mold member with one of the interlock means being located at one end of the flash-contacting region of said one mold member and another interlock means located at the oppositely disposed end of the flash-contacting region of the other mold member.

21. In the process of blow molding an article in a mold comprising partable mold members each of which is provided with a cavity, at least one mold member being provided with a flash-receiving relieved area separated from its associated cavity by means of a narrow pinch-off land, the other mold member being provided with a pinch-off land adapted to cooperate with the pinch-off land of said one mold member, and in which method the material to be blow molded is heated and formed into a parison, the mold members brought together to simultaneously cause the article-forming portion of the parison to be trapped within the aligned cavities of the mold members to thereby facilitate the blowing operation and the said cooperating lands to form a thin frangible web between the flash and the article-forming portions of the parison, the improvement which comprises:

(A) squeezing said flash between the flash-contacting regions of the mold members and displacing at least two offset, oppositely disposed portions of said flash into a configuration in which each said portion is interlocked with a flash-contacting region, (B) cooling said flash during the blowing operation to solidify the displaced interlocked portions, and (C) commencing separation of said mold members following article formation with the formed article maintained substantially rotationally stationary, whereby each said interlocked portion of said flash is moved outwardly relative to the formed article thereby causing said flash to twist and fracture said connecting web.

References Cited
UNITED STATES PATENTS

| | | | |
|---|---|---|---|
| 3,031,718 | 5/1962 | Adams | 18—5 X |
| 3,278,664 | 10/1966 | Langecker | 18—5 X |
| 3,283,047 | 11/1966 | Savary | 264—94 X |
| 3,354,246 | 11/1967 | Branscum | 18—5 X |
| 3,362,282 | 1/1968 | Hagen | 18—5 |

WILBUR L. McBAY, Primary Examiner

U.S. Cl. X.R.

18—5, 19, 35; 264—161

PO-1050
(5/69)

UNITED STATES PATENT OFFICE
CERTIFICATE OF CORRECTION

Patent No. 3,499,071  Dated March 3, 1970

Inventor(s) CHARLES W. HURST

It is certified that error appears in the above-identified patent and that said Letters Patent are hereby corrected as shown below:

Column 3, line 56, after "small" insert -- a -- .

Column 7, line 28, after "A" insert -- is -- .

Column 9, line 70, after "area" insert -- , said interlock means being adapted -- .

SIGNED AND
SEALED
JUL 7 1970

(SEAL)
Attest:

Edward M. Fletcher, Jr.
Attesting Officer

WILLIAM E. SCHUYLER, JR.
Commissioner of Patents